(12) United States Patent
Trimberger

(10) Patent No.: US 7,853,799 B1
(45) Date of Patent: Dec. 14, 2010

(54) MICROCONTROLLER-CONFIGURABLE PROGRAMMABLE DEVICE WITH DOWNLOADABLE DECRYPTION

(75) Inventor: Stephen M. Trimberger, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 1588 days.

(21) Appl. No.: 10/877,900

(22) Filed: Jun. 24, 2004

(51) Int. Cl.
*G06F 11/30* (2006.01)
(52) U.S. Cl. .............................. 713/189; 713/1; 713/2; 713/190; 713/191; 713/181; 726/28; 726/34; 380/44; 380/45; 380/277; 380/278; 380/279; 380/29; 380/37
(58) Field of Classification Search .............. 713/189, 713/1, 2, 190, 191, 193, 181; 380/44, 45, 380/277–279, 37, 29; 726/28, 34
See application file for complete search history.

(56) References Cited

U.S. PATENT DOCUMENTS

| | | | | |
|---|---|---|---|---|
| 5,771,287 A * | 6/1998 | Gilley et al. | ................ | 713/191 |
| 6,073,238 A * | 6/2000 | Drupsteen | .................... | 726/20 |
| 6,118,869 A * | 9/2000 | Kelem et al. | .................. | 380/44 |
| 6,356,637 B1 * | 3/2002 | Garnett | ....................... | 380/265 |
| 6,366,117 B1 * | 4/2002 | Pang et al. | .................... | 326/38 |
| 6,480,954 B2 * | 11/2002 | Trimberger et al. | ............ | 713/1 |
| 6,496,971 B1 * | 12/2002 | Lesea et al. | .................... | 716/16 |
| 6,654,889 B1 * | 11/2003 | Trimberger | .................. | 713/191 |
| 6,834,347 B2 * | 12/2004 | Goodman et al. | ........... | 713/191 |
| 6,996,713 B1 * | 2/2006 | Trimberger | ................. | 713/161 |
| 7,047,465 B1 * | 5/2006 | Trimberger | ................. | 714/725 |
| 7,162,644 B1 * | 1/2007 | Trimberger | ................. | 713/189 |
| 7,188,255 B1 * | 3/2007 | Toh et al. | .................... | 713/191 |
| 7,237,121 B2 * | 6/2007 | Cammack et al. | ........... | 713/189 |
| 2001/0015919 A1 * | 8/2001 | Kean | .......................... | 365/200 |
| 2001/0037458 A1 * | 11/2001 | Kean | .......................... | 713/193 |
| 2002/0199110 A1 * | 12/2002 | Kean | .......................... | 713/189 |
| 2003/0110390 A1 * | 6/2003 | May | .......................... | 713/194 |
| 2003/0123669 A1 * | 7/2003 | Koukoulidis et al. | ......... | 380/281 |
| 2003/0236992 A1 * | 12/2003 | Yami | .......................... | 713/200 |
| 2004/0252831 A1 * | 12/2004 | Uehara | ........................ | 380/44 |
| 2005/0089160 A1 * | 4/2005 | Crispin et al. | ................. | 380/28 |
| 2005/0210287 A1 * | 9/2005 | Paatero | ....................... | 713/201 |

OTHER PUBLICATIONS

Schneier, Bruce; *Applied Cryptography*; Chapter 18 "One-Way Hash Functions"; Second Edition; Copyright 1996 by Bruce Schneier; published by John Wiley & Scons, Inc.; 1996; pp. 429-459.
U.S. Appl. No. 10/714,380, filed Oct. 31, 2003, Trimberger.

* cited by examiner

*Primary Examiner*—Edan Orgad
*Assistant Examiner*—Canh Le
(74) *Attorney, Agent, or Firm*—LeRoy D. Maunu

(57) ABSTRACT

A programmable encryption approach involves the use of a downloadable decryptor. According to an example embodiment of the present invention, an FPGA device includes a microcontroller for configuring logic circuitry on the FPGA device. A memory register is implemented for storing encryption key data and a message authentication code (MAC). When the FPGA device is to be configured using a configuration bitstream, a MAC is calculated for a decryptor and sent to the microcontroller along with an encryption key. The microcontroller stores the encryption key and MAC in a register to which access is limited. When the decryptor is downloaded to the microprocessor, a MAC is calculated on the downloaded decryptor and compared with the stored MAC. If the calculated MAC matches the stored MAC, the decryptor is allowed to access the key.

29 Claims, 4 Drawing Sheets

MICROCONTROLLER-CONFIGURABLE PROGRAMMABLE DEVICE WITH DOWNLOADABLE DECRYPTION

FIELD OF THE INVENTION

The present invention generally relates to downloadable decryption in a programmable logic device having an embedded microcontroller.

BACKGROUND

Programmable devices such as a programmable logic device (PLD) and a field-programmable gate array (FPGA) are integrated circuits that may be programmed by a user (e.g., a circuit designer) to perform specified functions. Programmable devices are becoming ever more popular, largely because they are less expensive in relatively small quantities and require less time to implement than semi-custom and custom integrated circuits.

Typical FPGAs are general-purpose programmable devices that are customizable by an end user to realize a desired user-specific circuit. The basic device architecture of an example type of FPGA involves an array of configurable logic blocks embedded in a configurable interconnect structure including I/O blocks configurable as, for example, an output buffer, an input buffer or a bidirectional buffer. An I/O block is configurable to register incoming data, to register outgoing data, and/or to provide a tri-state output. A configurable logic block is configurable to perform one of many logic functions. For example, a configurable logic block may be configured to realize combinational logic elements, sequential logic elements, lookup tables, and/or control multiplexers.

To realize a desired user-specific circuit, the end user configures the configurable interconnect structure to connect the circuitry of multiple configured configurable logic blocks and multiple configured I/O blocks together so that the resulting circuit is the desired user-specific circuit. The configuration of the logic and interconnects for this type of FPGA is typically accomplished by downloading a bitstream from an external memory to the FPGA. Configuration logic implemented with the FPGA transmits the bitstream from an input to configuration memory on the FPGA.

Downloading configuration information is useful for a variety of purposes, making the implementation of the FPGA highly flexible. However, since the configuration bitstream is transmitted from an external source, a potential pirate may intercept the bitstream and make unauthorized copies of the configuration. For this reason, many FPGAs include bitstream encryption. Bitstream encryption relies on an encryption key that is used to encrypt the bitstream. A corresponding decryption key (typically the same as the encryption key) is stored on the FPGA and used by the FPGA configuration logic to decrypt the bitstream before loading it into configuration memory. With this approach, a potential pirate can still steal the encrypted bitstream, but the bitstream is useless without the key. In this regard, only an FPGA that has the proper key can use the bitstream.

Unfortunately, decryption circuitry may be large, taking up valuable chip area. Also, decryption circuitry is used only during chip configuration, typically lasting only milliseconds when the FPGA power is turned on. Devoting such a large chip area to a configuration process that is so short is generally undesirable.

One approach to addressing the above-discussed issues regarding the amount of chip area used by decryption circuitry involves the use of microcontroller-implemented configuration logic. Relative to on-chip decryption circuitry, microcontroller-implemented configuration logic takes up a relatively small amount of space. Implementation of such a microcontroller might typically involve downloading boot code for the microcontroller before a configuration bitstream is sent. Downloading the boot code alleviates the need for a non-volatile memory for storing the microcontroller code and permits a user of an FPGA to download a custom downloadable decryptor, since only the key is required to be kept secret.

Implementing downloadable decryption technology with microcontroller-implemented configuration logic as discussed above would, however, involve the microcontroller reading encryption-related data, such as an encryption key. When the microcontroller is allowed to read encryption-related data, however, a pirate or other adverse party could access the encryption-related data by programming the microcontroller to read the encryption-related data and write that data to output pins. Once discovered, the encryption-related data can be used to gain unauthorized access to encrypted data.

The present invention may address one or more of the above issues.

SUMMARY OF THE INVENTION

According to an example embodiment of the present invention, an FPGA processing approach involves a microcontroller-configurable FPGA with encryption. The encryption involves the use of a key register and an authentication code register, with the authentication code register being implemented to inhibit unauthorized access to information in the key register and, ultimately, to the FPGA. With this approach, a flexible, microcontroller-implemented FPGA is implemented with end-user downloadable encryption technology while inhibiting unauthorized access to the FPGA and related data.

It will be appreciated that various other embodiments are set forth in the Detailed Description and Claims that follow.

BRIEF DESCRIPTION OF THE DRAWINGS

Various aspects and advantages of the invention will become apparent upon review of the following detailed description and upon reference to the drawings in which.

DETAILED DESCRIPTION

Figure 1:
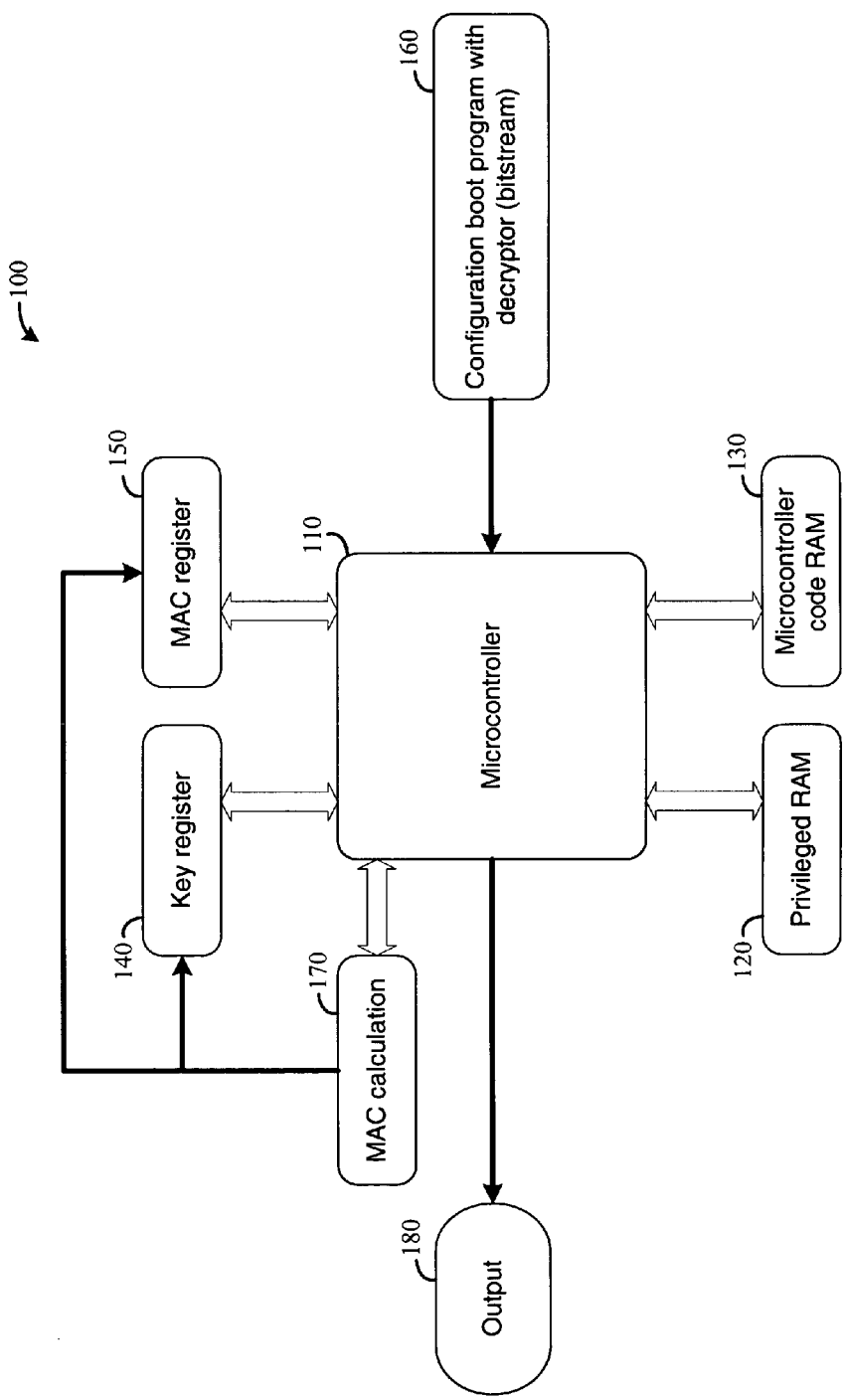
FIG. 1 shows an arrangement and approach for a microcontroller-implemented FPGA with encryption technology, according to an example embodiment of the present invention.

Various embodiments of the present invention are described in terms of a downloadable decryption approach with programmable hardware such as FPGAs. Those skilled in the art will appreciate that these and other example embodiments of the invention could be implemented in a variety of programming languages, applied to programmable logic devices (PLDs) other than FPGAs, applied to programmable blocks other than microcontrollers and/or adapted to various applications.

According to an example embodiment of the present invention, an integrated circuit is implemented with an embedded microcontroller (e.g., a soft or hard microprocessor) and programmable logic circuitry. In one implementation, the microcontroller is configured to download an authenticated decryptor (e.g., a decryption program) to privileged microcontroller memory. The integrated circuit includes a non-volatile storage element for storing an encryption key and an authentication code. When a decryptor is to be downloaded to the integrated circuit, an authentication code is generated and stored in the non-volatile storage element before downloading the decryptor. An encryption/decryption key for use by the decryptor is stored in the non-volatile storage element. Access to the key is generally limited, and in some instances is limited to access by the decryptor only.

When needed to decrypt a bitstream (e.g., for implementation on the integrated circuit), a decryptor program is downloaded to the integrated circuit as discussed above. Before the decryptor program is allowed access to the key, the authentication code is re-generated and compared with the authentication code stored in non-volatile memory. If the re-generated authentication code matches the stored authentication code, access to the key is permitted. The authentication code can be re-generated when the integrated circuit is used (e.g., a first request to access the key is made), as the decryptor program is downloaded, or at any time before the decryptor program accesses the key. With this approach, a field-downloaded decryptor is implemented with authentication protection that inhibits unauthorized access to the decryption key via the microcontroller.

In another implementation, access to a particular address range in the non-volatile memory is restricted as a function of the authentication code. Specifically, when access to the address range is requested, the authentication code is generated (or re-generated) and compared with the authentication code stored in the non-volatile memory. If the generated authentication code matches the stored authentication code, access to the particular address range is permitted. If the generated authentication code does not match the stored authentication code, access to the particular address range is denied. With this approach, access to sensitive data can be controlled.

In some instances, the authentication code is re-computed every time data is written to the particular address range. When key data is to be accessed for checking the data as part of decode circuitry, the authentication code is used to verify that the decode circuitry should be allowed access to the key. In this regard, access can be selectively restricted for write and/or read purposes involving a specific type of data as stored in the restricted address range.

In another example embodiment of the present invention, an authentication code as discussed above is generated using a secret key, which can be the same key as the encryption/decryption key or a different key. In this example, when a bitstream is downloaded it includes a keyed authentication code that has been computed using the secret key. An authentication code is re-computed using a secret key and the bitstream. The secret key may be implemented using, for example, by hardware on an integrated circuit as discussed above, with access to the secret key being limited (i.e., such that a user cannot access the key via the microcontroller). The re-computed authentication code is compared with the computed keyed authentication code included with the bitstream; if the authentication codes match, access to the stored encryption/decryption key is permitted. In this implementation, the authentication code is not necessarily stored in the non-volatile memory as discussed above.

Turning now to the figures, FIG. 1 shows a block diagram for an arrangement and approach 100, according to various example embodiments of the present invention. The arrangement 100 is adapted for integration with programmable logic circuitry and may, for example, be implemented on-chip with an FPGA, with an output 180 being used for configuring and/or controlling the FPGA. The arrangement 100 includes a microcontroller 110 (e.g., a microprocessor), privileged RAM 120, code RAM 130, a key register 140 and a message authentication code (MAC) register 150. The privileged RAM 120 is used to store decryptor program and the code RAM 130 stores information for general operation of the microcontroller 110 in configuring programmable logic device 100. In some implementations, only the code in the privileged RAM 120 is allowed to access the key register 140. In other implementations, the key register 140 and the MAC register 150 are a single register accessible by the microcontroller 110. In addition, the key and MAC registers 140 and 150 can be implemented (separately or together) using a non-volatile type memory. Furthermore, in other implementations, privileged RAM 120 stores code for the microcontroller 110, such that code RAM 130 is not needed (e.g., privileged RAM 120 includes the functionality of code RAM 130).

The microcontroller 110 is adapted to receive a configuration boot program with decryptor program (e.g., a bitstream) as shown with block 160. This configuration boot program is typically generated by an end-user (i.e., in the field) and downloaded to the microcontroller 110, with the decryptor program being stored in the privileged RAM 120. The configuration boot program is used to generate information for configuring programmable logic circuitry via output 180. A message authentication code (MAC) generated with the decryptor program prior to downloading is also downloaded to the microcontroller 110 and stored in the MAC register 150. A key for the decryptor program is also downloaded to the microcontroller 110 and stored in the key register 140. The key and MAC are typically downloaded separately from the decryptor program (bitstream).

When the decryptor program stored in the privileged RAM is initially executed, a MAC is calculated by the decryptor program (represented by block 170) and compared with the MAC stored in the MAC register 150. In one instance, the MAC is calculated while a configuration bitstream is being downloaded using, e.g., cryptographic software or hardware. If the calculated MAC matches the MAC stored in the MAC register 150, the decryptor program is allowed to access the key in the key register. In another embodiment, the MAC may be calculated prior to execution of the decryptor program. For instance, when a decryptor program for an FPGA requires access to the key data, the MAC-facilitated access to the key register 140 is used to control the decryptor program's ability to gain access to the key data. In some implementations, write access to the privileged RAM 120 (and to the MAC register 150) is not permitted after a match between the stored MAC and the calculated MAC is made. In other implementations, write access to the privileged RAM 120 is permitted, with the requirement that the MAC be reset and re-checked before the microcontroller may execute data written to the privileged RAM.

After the decryptor program is downloaded and the MAC is checked, the arrangement 100 can be used for generating configuration outputs for an FPGA. For example, when an encrypted configuration bitstream is received at the microcontroller 110 and a calculated MAC matches the MAC stored in the MAC register 150, the decryptor program in privileged RAM 120 is permitted to access the key register 140. The decryptor program is then used to decrypt the configuration bitstream from which a decrypted configuration bitstream at output 180 is generated (e.g., for storage in a configuration data register used to configure an FPGA). In addition, once the decrypted configuration bitstream 180 has been generated (and used to configure an FPGA), the microcontroller 110 can optionally be configured for performing other processes' with the configured FPGA.

For general information regarding FPGA implementations and for specific information regarding on-chip processing approaches that may be implemented in connection with one or more example embodiments herein, reference may be made to U.S. Pat. No. 6,496,971 (Lesea, et. al.) entitled "Supporting Multiple FPGA Configuration Modes Using Dedicated On-chip Processor," which is fully incorporated herein by reference.

For further general information regarding FPGA implementations and for specific information regarding approaches to implementing an FPGA with a microcontroller and encryption protection, reference may be made to U.S. patent application Ser. No. 10/714,380, filed on Oct. 31, 2003, and entitled "System and Method for Securing Using Decryption Keys During FPGA Configuration Using a Microcontroller," which is fully incorporated herein by reference. For example, various approaches to limiting and protecting the field-programmability of FPGAs as applicable in connection with one or more example embodiments of the present invention may be implemented as described in the above-referenced U.S. Patent document entitled "System and Method for Securing Using Decryption Keys During FPGA Configuration Using a Microcontroller."

Figure 2:
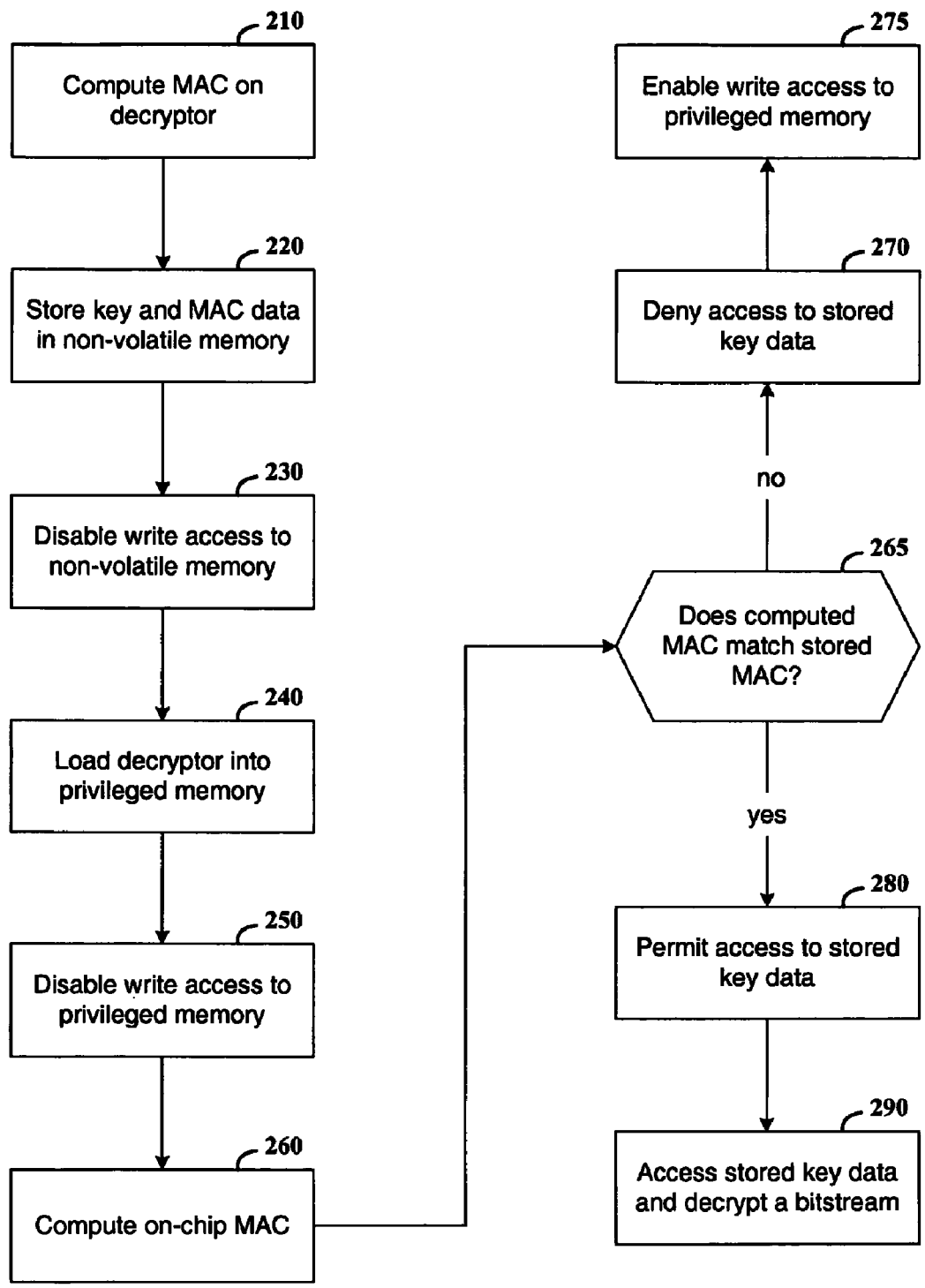
FIG. 2 is a flow diagram showing an approach for microcontroller-implemented FPGAs, according to another example embodiment of the present invention.

FIG. 2 is a flow diagram showing an approach for microcontroller-implemented field-programmable devices, according to another example embodiment of the present invention. At block 210, a message authentication code (MAC) is computed using code for a decryptor, with the computed MAC data being stored in non-volatile memory along with an encryption key at block 220.

The MAC may be implemented using one or more of a variety of approaches and may include, for example, a digital signature or other similar type of code. For instance, one approach involves using an encryptor in cipher block chaining (CBC) mode to encrypt data, saving a value from a chaining register which was developed during the CBC mode. The final value of the chaining register is used as the signature because it depends on all the data and is cryptographically difficult to fake. This approach is further documented in the Federal Information Processing Standards (FIPS) Publication 113 from the National Institute of Standards and Technology (NIST).

Another approach to generating the MAC involves using a Keyed-Hash MAC as documented in FIPS Publication 198 from the NIST. In some instances, the Keyed-Hash MAC approach uses a secret key, which may be implemented with a stored key. Referring to FIG. 1 as an example, key register 140 or another similar key register may be used to store the secret key. Such a secret key approach may be implemented, for example, without a MAC register (such as MAC register 150), using the secret key to compute a MAC result that does not necessarily need to be stored. In this regard (and continuing to refer to FIG. 1), the MAC calculation 170 carries out the calculation of a MAC using the secret key. The microcontroller 110 permits access to the key register for decryption when the calculated MAC matches a MAC received with the bitstream shown with block 160. In addition, for general information regarding encryption and for specific information regarding approaches to the calculation of a MAC that may be used in connection with one or more of the example embodiments discussed herein, reference may be made to Bruce Schneier, *Applied Cryptography, Second Edition: protocols, algorithm and source code in C*, Wiley, 1996, which is fully incorporated herein by reference.

After the MAC data and key have been stored at block 220, write access to the non-volatile memory is disabled at block 230. The decryptor program is then loaded into privileged memory for use by the microcontroller at block 240 and write access to the privileged memory is disabled at block 250. When access to the stored key is requested (e.g., upon execution of the decryptor program for use in decrypting a configuration bitstream), an on-chip MAC is computed at block 260 for comparison to the MAC stored in the non-volatile memory. If the computed MAC does not match the stored MAC at block 265, access to the stored key data is denied at block 270. If the computed MAC matches the stored MAC at block 265, access to the key data stored in non-volatile memory is permitted at block 280 and the stored key data is accessed to decrypt a bitstream at block 290.

In another implementation, and referring again to FIG. 2, a failure to match the computed MAC with the stored MAC at block 265 is followed by enabling write access to privileged memory at block 275. With this approach, a new decryptor with a proper MAC can be loaded into privileged memory (e.g., if a mistake was made). The process would then resume at block 240.

In another implementation, disabling write access to the non-volatile memory at block 230 includes disabling unrestricted write access, but enabling restricted access that requires that the key be overwritten (or deleted) upon access to the non-volatile memory. As discussed above, this approach facilitates the protection of key data but also allows the key data to be changed (with a new corresponding MAC being simultaneously implemented).

Figure 3:
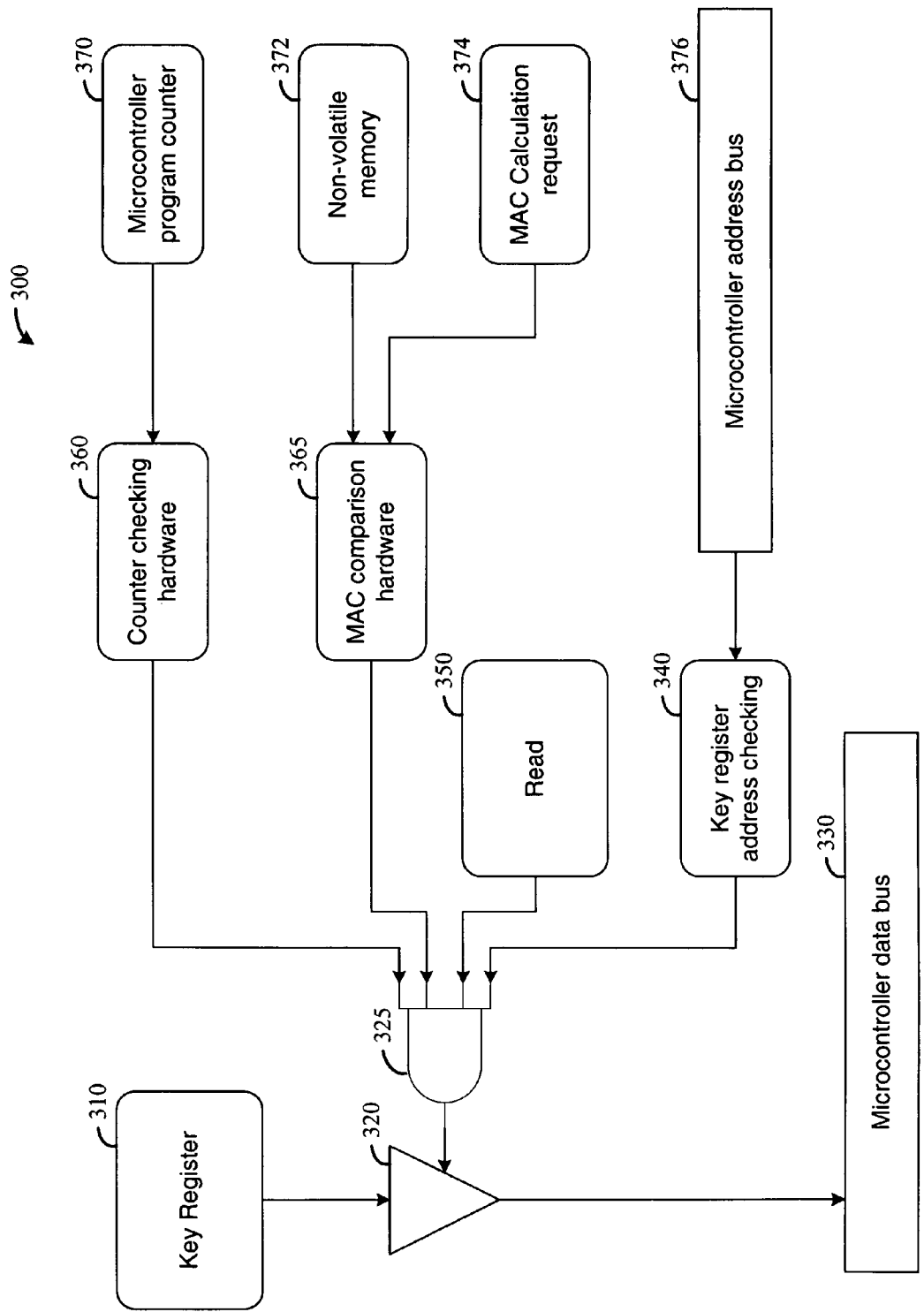
FIG. 3 shows an arrangement and approach for authentication-controlled key access with a programmable device, according to another example embodiment of the present invention.

FIG. 3 shows an arrangement and approach 300 for authentication-controlled key access with a programmable logic device, according to another example embodiment of the present invention. This arrangement 300 may, for example, be implemented with a microcontroller as shown in the other figures and discussed herein. Key data is stored in a key register 310 for use in decrypting incoming configuration bitstreams, with access to key data in the key register by a microcontroller data bus 330 being controlled with a gate circuit 320 that is operated with an AND gate 325 having four inputs. The AND gate 325 correspondingly allows access to the key register 310 when its four inputs are all logic level "TRUE" as discussed further below.

One input of the AND gate 325 is coupled to a data read signal (represented by block) 350. When a processor read cycle is issued (e.g., by a microcontroller 110 in FIG. 1) to read data from register 310, the read signal 350 is asserted as a logic level "TRUE" signal. This "TRUE" signal is presented to AND gate 325.

Another input of the AND gate 325 is coupled to a key register address checking block 340. For a read key function, the address on microcontroller address bus 376 addresses the key register 310. Key-address check block 340 compares the address from the microcontroller address bus 376 to the address of the key register 310. If the addresses match, a logic level "TRUE" signal is asserted to the AND gate 325.

A third input of the AND gate 325 is coupled to program counter checking hardware 360, which checks whether a microcontroller program counter address 370 is within the range of addresses of privileged memory (i.e., over a minimum and less than a maximum privileged address). If the program counter address is within the range of addresses of privileged memory, the program counter checking hardware 360 asserts a logic level "TRUE" signal to the AND gate 325.

The fourth input to the AND gate 325 is coupled to MAC comparison hardware 365, which compares a MAC in a non-volatile memory 372 with a MAC calculated on the code in the privileged memory using a MAC calculation request function 374. If the calculated MAC is correct (i.e., matches the MAC in non-volatile memory 372), the MAC comparison hardware 365 asserts a logic level "TRUE" signal to the AND gate 325.

When the four input signals to the AND gate 325 from read signal 350, key register address checking block 340, program counter checking hardware 360 and MAC comparison hardware 365 are logic level true, the AND gate enables the gate 320. When enabled, gate 320 passes the contents of the key register 310 to the microcontroller data bus 330.

Figure 4:
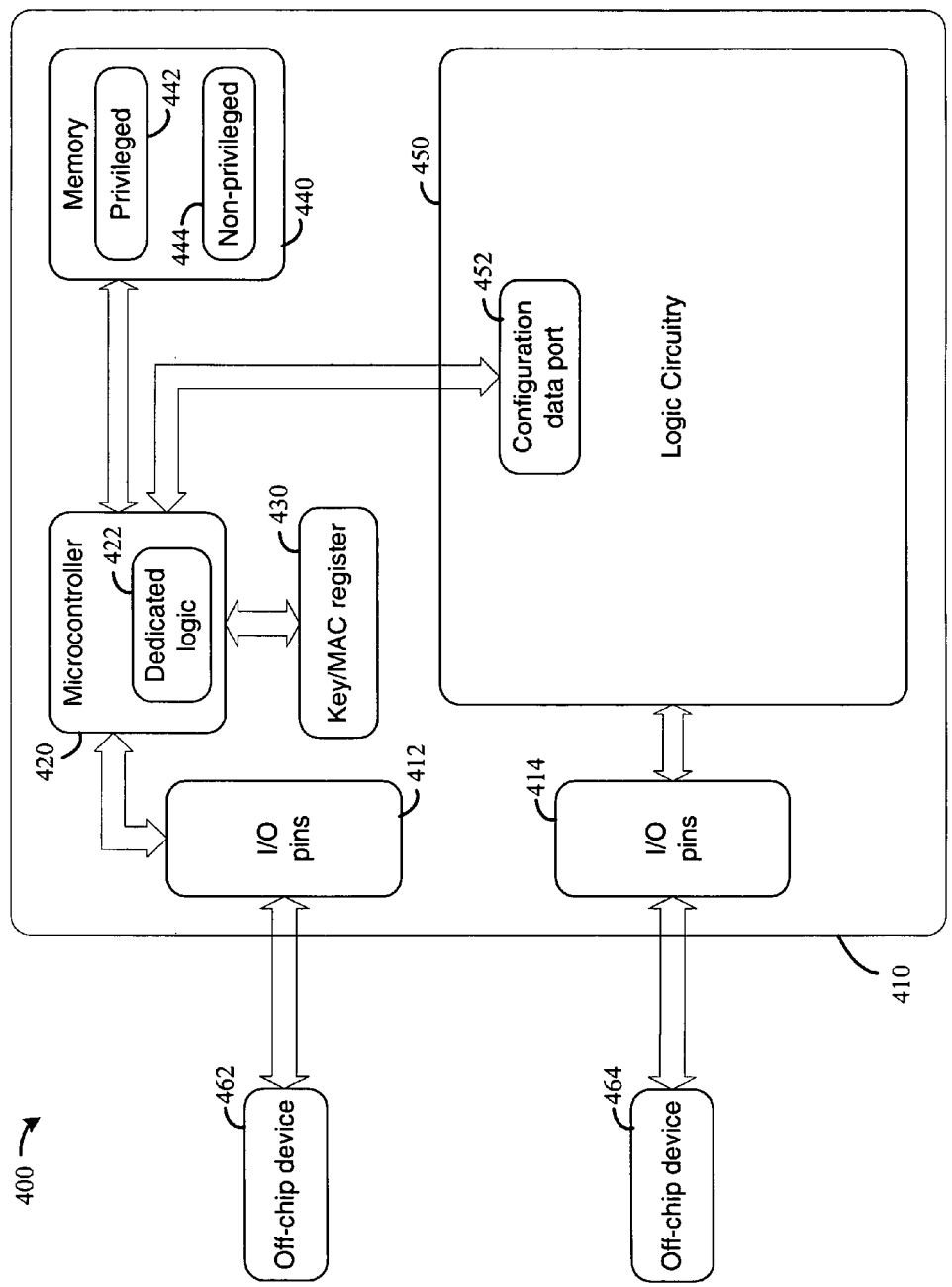
FIG. 4 shows a microcontroller-controlled FPGA arrangement with the microcontroller embedded in a chip with the FPGA, according to another example embodiment of the present invention.

FIG. 4 shows a microcontroller-implemented FPGA arrangement 400 having a microcontroller 420 embedded with FPGA logic circuitry 450 in a chip 410, according to another example embodiment of the present invention. The FPGA chip 410 receives input signals and passes output signals via I/O pins 412 and 414. The I/O pins 412 are coupled to the microcontroller 420, which is in turn coupled to a key/MAC register 430, memory 440 and programmable logic circuitry 450 via a configuration data port 452. The I/O pins 414 are coupled to the programmable logic circuitry 450 for receiving input signals and passing output signals. Each of the I/O pins 412 and 414 can be coupled with one or more of a variety of types of off-chip devices, represented by off-chip devices 462 and 464.

The microcontroller 420 is adapted to receive and process input signals including a decryption program, configuration code, key data and MAC data as described, for example, above in connection with FIG. 1. The microcontroller 420 may be implemented with an embedded microprocessor such as the PowerPC® from IBM® Inc. of Armonk, N.Y., a software processor such as Microblaze™ from Xilinx® Inc. of San Jose Calif. or an emulated processor. Key and MAC data received at the microcontroller 420 is stored at the Key/MAC register 430. The decryption program to be executed by the microcontroller 420 is stored in a privileged address range 442 of the memory 440, and configuration code received at the microcontroller 420 is stored in a non-privileged address range 444 of the memory 440. Write access to the privileged address range 442 is then disabled by the microcontroller. Input signals received at the microcontroller 420 may include, for example, code identified by address ranges, with address ranges in the privileged address range being selectively stored in the privileged address range 442.

In one implementation, the Key/MAC register 430 can only be written with key and MAC data simultaneously. When data is written to the Key/MAC register 430, key data in the key register is erased (e.g., one cannot write only a MAC to the Key/MAC register while leaving key data in place). In this way, an attempt to change the MAC in the Key/MAC register, which could be an initial stage in an attempt to steal the key, would result in the key data stored in the Key/MAC register 430 being lost.

When code (e.g., an incoming configuration bitstream received via the input pins 412) requires access to the key in register 430, the microcontroller 420 calculates a MAC using the encryption code stored in the privileged address range 442. Dedicated logic 422 (e.g., implemented in a manner as shown in and described with FIG. 3) compares the calculated MAC to the MAC stored in the register 430 and, if the comparison shows a match, allows the code to access the key in register 430. If the calculated MAC does not match the stored MAC, the code is not permitted to access the key in register 430.

Once a matching MAC is generated, code at the microcontroller 420 can access the key stored in the register 430 for use in configuring the logic circuitry 450. In this regard, code using the accessed key for decryption is used to decrypt configuration bitstream, which is used for configuring the logic circuitry 450 via the configuration data port 452. When configured, the logic circuitry 450 receives inputs and generates outputs that are passed via I/O pins 414.

Those skilled in the art will appreciate that various alternative circuit arrangements would be suitable for hosting the processes of the different embodiments of the present invention, including using a microcontroller to control an FPGA with downloadable decryption. In addition, the processes may be provided via a variety of computer-readable media or delivery channels such as magnetic or optical disks or tapes, electronic storage devices, or as application services over a network.

The present invention is believed to be applicable to a variety of systems employing programmable devices and has been found to be particularly applicable and beneficial in approaches involving programmable devices with downloadable decryption that is susceptible to unauthorized access. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method for configuring an integrated circuit having programmable circuitry and a microcontroller, the method comprising:
   receiving and storing an encryption key and an authentication code in a register;
   receiving and storing a decryption program;
   generating an authentication code based on the decryption program;
   re-generating the authentication code based on the decryption program every time a new encryption key is written to the register;
   comparing the generated authentication code to the stored authentication code;
   in response to the generated authentication code matching the stored authentication code, permitting the decryption program to access the encryption key;
   in response to the generated authentication code matching the stored authentication code, using the decryption program and the encryption key to decrypt configuration data; and
   in response to the generated authentication code not matching the stored authentication code, denying access to the encryption key by the decryption program.

2. The method of claim 1, further comprising outputting the decrypted configuration data for use in configuring the programmable circuitry.

3. The method of claim 1, further comprising configuring the programmable circuitry with the decrypted configuration data.

4. The method of claim 1, wherein receiving and storing an encryption key and an authentication code in a register includes storing the encryption key and authentication code in a register that is integrated on the integrated circuit and to which access is restricted as a function of the comparing of the generated authentication code to the stored authentication code.

5. The method of claim 1, wherein comparing the generated authentication code to the stored authentication code includes comparing the generated authentication code to the stored authentication code in response to a request for access to the encryption key by the decryption program.

6. The method of claim 1, further comprising:
programming the microcontroller with cryptographic software; and
wherein generating an authentication code based on the decryption program includes using the cryptographic software to generate the authentication code.

7. The method of claim 1, further comprising receiving a configuration bitstream including the decryption program and encrypted configuration data for configuring the programmable circuitry and decrypting the configuration data in response to the generated authentication code matching the stored authentication code.

8. The method of claim 7, wherein generating an authentication code based on the decryption program includes generating the authentication code while receiving the bitstream.

9. The method of claim 1, further comprising preventing write access to the register after the authentication code has been generated.

10. The method of claim 1, further comprising overwriting an encryption key stored in the register upon receiving a new authentication code to be stored in the register.

11. The method of claim 10, wherein overwriting the encryption key includes deleting an encryption key stored in the register upon receiving a new authentication code to be stored in the register.

12. The method of claim 10, wherein overwriting the encryption key includes overwriting an encryption key by storing a new encryption key in the register.

13. The method of claim 1, further comprising re-generating the authentication code every time access to the encryption key is sought and controlling access to the encryption key as a function of the re-generated authentication code.

14. A method for configuring an integrated circuit having a programmable circuitry and a microprocessor, the method comprising:
receiving and storing an encryption key and a secret key;
receiving and storing a decryption program;
generating an authentication code based on the decryption program using the secret key;
receiving an authentication code;
wherein receiving the decryption program and receiving the authentication code includes receiving the decryption program and the authentication code in a configuration bitstream, the configuration bitstream further including encrypted configuration data for configuring the programmable circuitry;
comparing the generated authentication code to the received authentication code;
in response to the generated authentication code matching the received authentication code, permitting the decryption program to access the encryption key;
in response to the generated authentication code matching the received authentication code, using the decryption program and the encryption key to decrypt configuration data; and
in response to the generated authentication code not matching the received authentication code, denying access to the encryption key by the decryption program.

15. An integrated circuit device comprising:
a programmable logic circuit integrated on a chip and having a configuration data port;
a register integrated on the chip and arranged for storage of an encryption key and an authentication code;
a memory integrated on the chip and arranged for storage of decryption data; and
a microcontroller integrated on the chip and coupled to the register, the memory and the configuration data port of the programmable circuit, the microcontroller configured and arranged to,
receive and store an encryption key and an authentication code in the register;
receive and store a decryption program in the memory;
receive a configuration bitstream including the decryption program and encrypted configuration data for configuring the programmable circuit;
generate an authentication code based on the decryption program, in response to a request to access the encryption key;
re-generate the authentication code every time a new encryption key is written to the register;
control access to the encryption key as a function of matching characteristics between the generated authentication code and the authentication code stored in the register; and
decrypt the configuration data using the encryption key.

16. The device of claim 15, wherein the microcontroller is configured and arranged to output the decrypted configuration data for use in configuring the programmable circuit.

17. The device of claim 15, wherein the microcontroller is configured and arranged to configure the programmable logic circuit with decrypted configuration data.

18. The device of claim 15, wherein the microcontroller is programmed with cryptographic software and configured and arranged to use the cryptographic software to generate the authentication code.

19. The device of claim 15, wherein the microcontroller is further configured and arranged to generate the authentication code while downloading the bitstream.

20. The device of claim 15, wherein the microcontroller is configured and arranged to store the decrypted configuration data in the register.

21. The device of claim 15, wherein the register is a non-volatile register.

22. The device of claim 15, wherein the microcontroller is configured and arranged to prevent write access to the register after the authentication code has been generated.

23. The device of claim 15, wherein a selected address range of the memory is predefined as privileged and wherein the microcontroller is configured and arranged to prevent write access to the privileged address range after the authentication code has been generated.

24. The device of claim 15, wherein the microcontroller is further configured and arranged to overwrite an encryption key stored in the register upon receiving a new authentication code to be stored in the register.

25. The device of claim 24, wherein the microcontroller is further configured and arranged to overwrite the encryption key by deleting an encryption key stored in the register upon receiving a new authentication code to be stored in the register.

26. The device of claim 24, wherein the microcontroller is further configured and arranged to overwrite an encryption key by storing a new encryption key in the register.

27. The device of claim 15, wherein the microcontroller is configured and arranged to re-generate the authentication code every time access to the encryption key is sought and to control access to the encryption key as a function of the re-generated authentication code.

28. An integrated circuit device comprising:
a programmable circuit integrated on a chip and having a configuration data port;
a register integrated on the chip and arranged for storage of an encryption key and a secret key;
a memory integrated on the chip and arranged for storage of decryption data;
an authentication circuit configured and arranged to access the secret key and to compute an authentication code based on the decryption data; and
a microcontroller integrated on the chip and coupled to the register, the memory and the configuration data port of the programmable logic circuit, the microcontroller configured and arranged to,
receive and store an encryption key and a secret key in the register;
receive and store a decryption program in the memory;
receive an authentication code;
control access to the encryption key as a function of matching characteristics between the authentication code computed by the authentication circuit and the received authentication code; and
decrypt configuration data using the encryption key; and
wherein the authentication circuit is further configured to re-compute the authentication code every time the microcontroller receives and stores a new encryption key.

29. A programmable gate array chip comprising:
a gate circuit array;
a microcontroller code memory;
a non-volatile register for storing an encryption key and a message authentication code (MAC); and
an embedded microcontroller coupled to the gate circuit array, the microcontroller code memory and the non-volatile register, the embedded microcontroller configured and arranged to,
receive and store an encryption key and a MAC in the non-volatile register;
receive and store a decryption program in the microcontroller code memory;
generate a MAC using the stored decryption program and compare the generated MAC with the MAC stored in the MAC register;
re-generate the MAC every time a new encryption key is stored in the non-volatile register;
permit access to the encryption key by the decryption program in response to the calculated MAC matching the stored MAC; and
deny access to the encryption key by the decryption program in response to the calculated MAC failing to match the stored MAC.

* * * * *